United States Patent
Wang et al.

(10) Patent No.: US 11,979,954 B2
(45) Date of Patent: May 7, 2024

(54) POWER CONVERTER HAVING CAPACITORS FOR DATA TRANSMISSION

(71) Applicant: Tridonic GmbH & Co KG, Dornbirn (AT)

(72) Inventors: Shuanghong Wang, Guangdong (CN); Zhihong Zou, Guangdong (CN); Jialiang Yan, Guangdong (CN)

(73) Assignee: Tridonic GmbH & Co KG, Dornbirn (AT)

( * ) Notice: Subject to any disclaimer, the term of this patent is extended or adjusted under 35 U.S.C. 154(b) by 219 days.

(21) Appl. No.: 17/760,543

(22) PCT Filed: Sep. 16, 2019

(86) PCT No.: PCT/CN2019/105993
§ 371 (c)(1),
(2) Date: Mar. 15, 2022

(87) PCT Pub. No.: WO2021/051240
PCT Pub. Date: Mar. 25, 2021

(65) Prior Publication Data
US 2022/0361304 A1 Nov. 10, 2022

(51) Int. Cl.
*H02M 1/32* (2007.01)
*H02M 1/44* (2007.01)
(Continued)

(52) U.S. Cl.
CPC .......... *H05B 45/3725* (2020.01); *H02M 1/32* (2013.01); *H02M 1/44* (2013.01); *H02M 3/33569* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 6,563,718 B1 * 5/2003 Li .................. H02M 7/103
363/21.13
7,408,996 B2 * 8/2008 Hershbarger ........ H04M 11/066
375/354
(Continued)

FOREIGN PATENT DOCUMENTS

CN 103427655 12/2013
CN 106411135 2/2017
(Continued)

OTHER PUBLICATIONS

PCT/CN2019/105993, International Search Report and Written Opinion dated Jun. 15, 2020, 9 pages.

*Primary Examiner* — Jeffrey A Gblende

(74) *Attorney, Agent, or Firm* — Andrus Intellectual Property Law, LLP

(57) ABSTRACT

A power converter with secondary side regulation (SSR) for driving one or more output loads having capacitors (preferably Y-capacitors) for feedback and data transmission is disclosed. The power converter includes a transformer with primary and secondary windings, a primary circuit, a secondary circuit comprising a secondary controller, and a data transmission circuit comprising a plurality of capacitors. The primary circuit comprises one or more switching means and a primary controller. The secondary circuit is isolated from the primary circuit by the transformer and connected to the output loads and the secondary winding. The data transmission circuit connects the secondary circuit to the primary circuit for transmitting a feedback signal through to
(Continued)

become a primary side feedback signal. The capacitors comprises one or more first capacitors on a feedback path and one or more second capacitors on a ground path.

14 Claims, 11 Drawing Sheets

(51) Int. Cl.
*H02M 3/335* (2006.01)
*H05B 45/3725* (2020.01)

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; Y02B 70/1491

See application file for complete search history.

(56) References Cited

U.S. PATENT DOCUMENTS

| | | | | |
|---|---|---|---|---|
| 8,680,837 | B2* | 3/2014 | Zeng | H03K 17/6877 |
| | | | | 327/109 |
| 9,755,530 | B2* | 9/2017 | Luo | H02M 3/33592 |
| 9,774,267 | B2* | 9/2017 | Lee | H02M 3/33523 |
| 10,003,267 | B1* | 6/2018 | Zhao | H02M 3/33573 |
| 11,165,285 | B2* | 11/2021 | Van Wageningen | |
| | | | | H02J 7/00034 |
| 2016/0373014 | A1* | 12/2016 | Pflaum | H02M 3/33523 |
| 2018/0198372 | A1* | 7/2018 | Ragonese | H02M 3/33553 |
| 2019/0280601 | A1 | 9/2019 | Song et al. | |

FOREIGN PATENT DOCUMENTS

| | | |
|---|---|---|
| CN | 107431434 | 12/2017 |
| CN | 108233749 | 6/2018 |
| CN | 109768728 | 5/2019 |

* cited by examiner

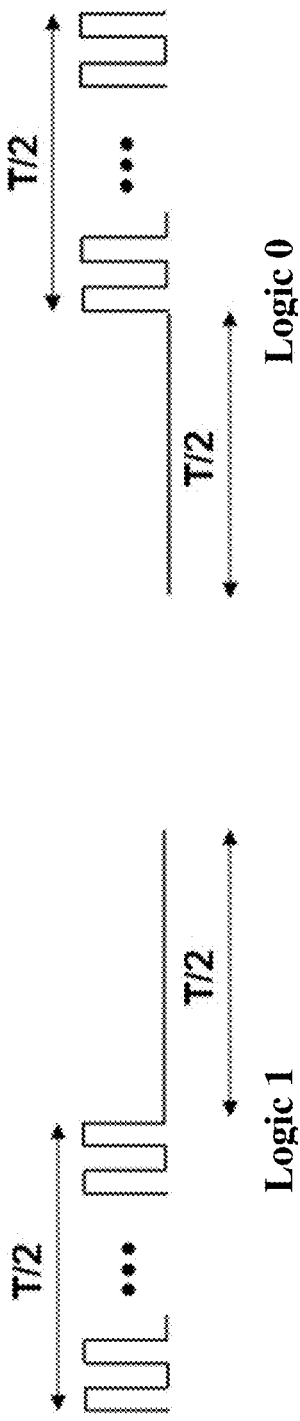

POWER CONVERTER HAVING CAPACITORS FOR DATA TRANSMISSION

CROSS REFERENCE TO RELATED APPLICATIONS

The present application is the U.S. national stage application of international application PCT/CN2019/105993 filed Sep. 16, 2019, which international application was published on Mar. 25, 2021 as International Publication WO 2021/051240 A1.

TECHNICAL FIELD

The present disclosure generally relates to power converters for driving light emitting diodes (LED) or other output loads. In particular, the present disclosure is directed to switched mode power converters with secondary side regulation (SSR) having Y-capacitors for feedback and data transmission from the secondary circuit to the primary circuit.

BACKGROUND

Switched mode power converters (also referred to as "power converters") are commonly used to provide regulated load currents to drive output loads especially for light emitting devices. The switched mode power converters are often configured to isolate the output load from the input power, such as an alternating current (AC) main or a direct current (DC) input voltage, and generate a conditioned DC output voltage for driving the output load. In the traditional isolated power converter topologies, output voltage regulation is usually performed with a secondary side feedback using an opto-coupler to electrically isolate and optically couple feedback information to the primary side.

One example of a conventional switched mode power converter with SSR for driving one or more light emitting diodes (LEDs) using opto-coupler for feedback and data transmission is shown in FIG. 1. For simplicity and clarity of illustration, common and well-understood elements (such as EMI filter, bridge rectifier, buffer, output rectifier, and smoothing capacitors) may not be depicted in FIG. 1 to facilitate a less obstructed view of the depicted features. The power converter 100 receives an input signal 101, which may be a DC voltage or a rectified signal from an AC main. The input signal 101 is coupled to a transformer 140 comprising a primary winding 141 and a secondary winding 142. A switching transistor 131 is configured to control the primary winding 141 of the transformer 140, such that current is induced in the secondary winding 142 of the transformer 140, which can isolate the output load from the primary circuit. The output current can be used to drive one or more output loads by connecting the output load to the VOUT+ 151 and VOUT− 152 ports.

In order to stabilize the output voltage at the secondary side, it is common to use an opto-coupler 110 to electrically isolate and optically couple feedback information from the secondary circuit to the primary circuit. Generally, the output signal at VOUT+ 151 is processed by a voltage divider 121 having two or more resistors. From the voltage divider 121, a voltage is generated for powering the secondary controller 120. The secondary controller 120 is configured to sense the output voltage and/or inductor current continuously, and couple a feedback signal to the primary controller 130 via an opto-coupler 110 to adjust the relative duty cycle of the switching transistor 131. FIGS. 2A and 2B show the waveforms of the feedback signals captured at the primary side and the secondary side of the opto-coupler 110, respectively. Therefore, the feedback signal from the secondary controller 120 can be coupled to the primary controller 130.

In conventional switched mode power converters, electrical isolation and data transmission are typically realized by the opto-coupler 110. However, in outdoor and industrial applications, higher surge voltage is expected between the primary side and the secondary side. The sudden rise in voltage may cause considerable damage to the components in the power converter. The AC main should be well protected with a higher surge requirement between the live/neutral (L/N) and the protective earth (PE). For example, if a surge voltage of >12 kV is expected between the primary side and the secondary side, then the surge requirement between the L/N and PE is at least 10 kV. However, a standard opto-coupler 110 available can only support up to 8 kV surge voltage. The cost of a specially designed opto-coupler 110 with higher surge voltage is significantly higher than a standard opto-coupler 110. This is not preferred for general and low-cost applications, such as outdoor LED devices and other industrial equipment.

In view of the deficiency of conventional switched mode power converters, there is a need in the art to have a switched mode power converter with SSR for driving LEDs or other output loads without the need of an opto-coupler. Particularly, feedback and data transmission from the secondary circuit to the primary circuit can be implemented using conventional passive components such that the system cost of the power converter can be reduced without any compromise on its performance or its safety. Furthermore, any noise and error in associated with the data transmission are also eliminated by a data encoding protocol.

SUMMARY

Provided herein is a power converter with SSR having capacitors, preferably Y-capacitors, for feedback and data transmission from the secondary circuit to the primary circuit and/or from the primary circuit to the secondary circuit. The power converter comprising a transformer, a primary circuit, a secondary circuit, and a data transmission circuit. The transformer includes a primary winding and a secondary winding. The primary circuit comprising at least one switching means coupled to the primary winding and a primary controller. The secondary circuit is isolated from the primary circuit by the transformer and connected to the one or more output loads and the secondary winding, and the secondary circuit comprises a secondary controller. The data transmission circuit connects the secondary circuit to the primary circuit for transmitting a feedback signal, and comprises a plurality of capacitors, preferably Y-capacitors. The plurality of capacitors comprises one or more first capacitors on a feedback path and one or more second capacitors on a ground path. The feedback signal is transmitted through the plurality of capacitors to become a primary side feedback signal at the primary circuit.

According to certain aspects, the secondary controller couples the feedback signal to the one or more first capacitors such that the primary side feedback signal is coupled to the primary controller based on the feedback signal.

According to certain aspects, the primary side feedback signal is a voltage surge signal comprising a plurality of voltage sparks corresponding to rising edges of the feedback signal.

According to certain aspects, the secondary controller is configured to generate the feedback signal digitally encoded by a coding method. According to a further aspect, the coding method is a special Manchester code, which is characterized in that a transition from a presence of a first pulse train to an absence of the first pulse train represents a logic 1, and another transition from an absence of a second pulse train to a presence of the second pulse train represents a logic 0.

According to a further aspect, the first pulse train and the second pulse train are delivered periodically in a form of a plurality of pulses for a period in the range of 1 ms to 20 ms.

According to a further aspect, the first pulse train and the second pulse train are delivered periodically with 100 pulses in 10 ms.

According to certain aspects, the feedback signal is arranged to carry a data packet comprising a start bit, a plurality of data bits, a parity bit, and a stop bit.

According to certain aspects, the data transmission circuit further comprises a two-stage voltage amplifier connected between the secondary controller and the one or more first capacitors. The two-stage voltage amplifier is a cascade of a common emitter amplifier followed by a common collector amplifier.

According to certain aspects, the primary controller comprises an internal comparator, a decoder, and a modulation generator selected from the group consisting of a pulse width modulation (PWM) generator, a frequency modulation generator, and a combination thereof.

According to certain aspects, the ground path has two or more second capacitors connected in series, and a protective earth is connected between any two adjacently connected capacitors of the two or more second capacitors.

According to certain aspects, the secondary controller is configured to detect a value of a negative temperature coefficient (NTC) thermistor in the secondary circuit or a second value of an external resistor which defines a nominal output current to be provided by the power converter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the power converter as disclosed herein. It will be appreciated that these drawings and graphs depict only certain embodiments of the invention and are not intended to limit its scope. The power converter as disclosed herein will be described and explained with additional specificity and detail through the use of the accompanying drawings in which:

FIG. 5 depicts the data format of the special Manchester code in accordance with an exemplary embodiment of the present disclosure.

FIG. 6 is a table showing the data format of the feedback signal transmitted from the secondary controller to the primary controller in accordance with an exemplary embodiment of the present disclosure.

Skilled artisans will appreciate that elements in the figures are illustrated for simplicity and clarity and have not necessarily been depicted to scale.

DETAILED DESCRIPTION

The present disclosure generally relates to power converters with SSR for driving light emitting diodes (LED) or other output loads. In particular, the present disclosure is directed to switched mode power converters having capacitors (e.g. Y-capacitors) for feedback and data transmission from the secondary circuit to the primary circuit and/or from the primary circuit to the secondary circuit. As the data transmission can be implemented using conventional passive components without the use of an opto-coupler, the system cost of the power converter can be reduced without any compromise on the performance and the safety standard.

In the following embodiments, the power converter and the system thereof are merely exemplary in nature and are not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of the circuit described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

For simplicity and clarity, relational terms such as "first," "second," and the like, if any, are used solely to distinguish one from another entry, item, or device, without necessarily requiring any actual such relationship or order between such entries, items, or devices. The terms "coupled" and "connected," along with any variant thereof, are used to cover any coupling or connection, either direct or indirect, between two or more elements unless otherwise indicated or clearly contradicted by context.

Figure 1:
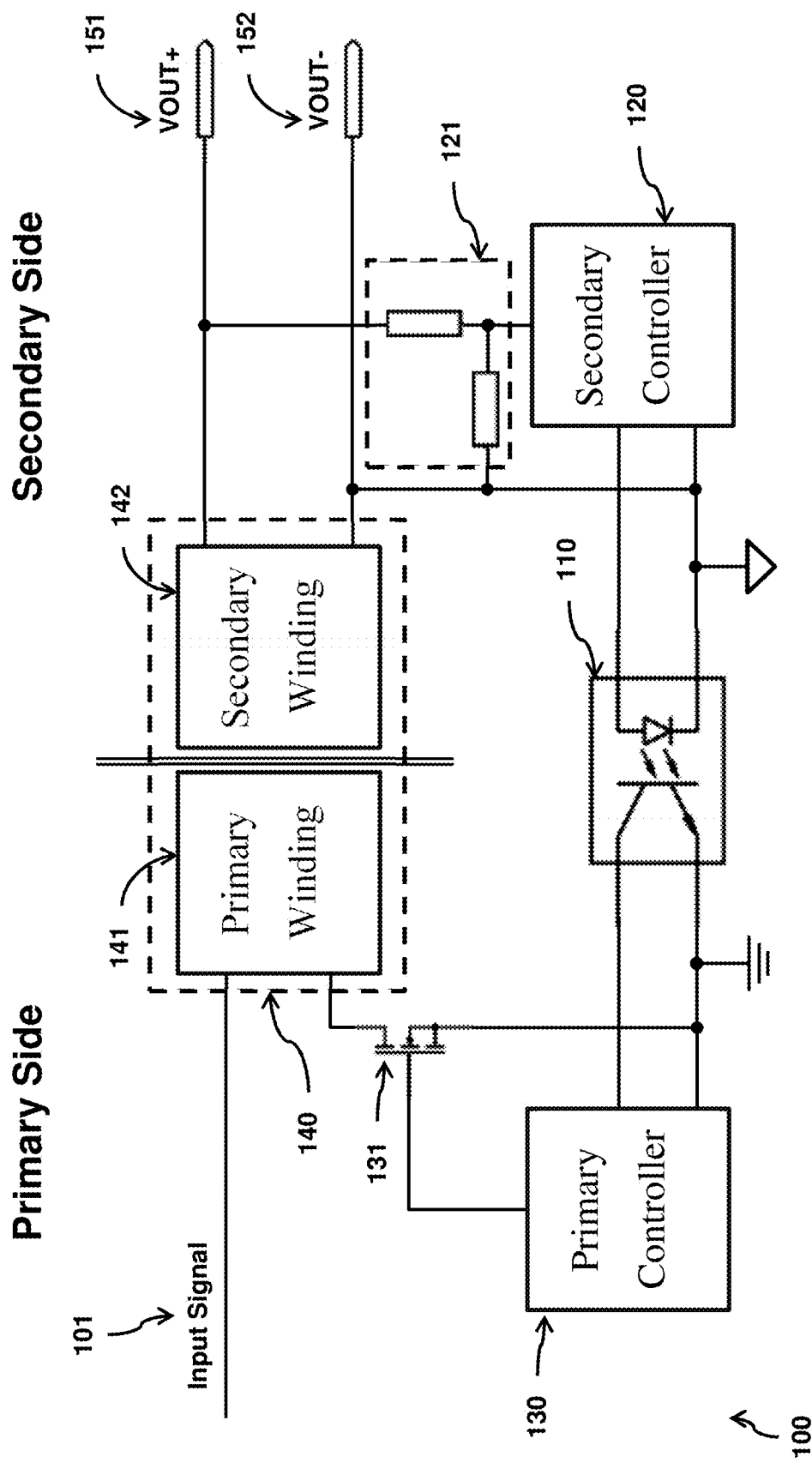
FIG. 1 depicts a simplified circuit diagram of a conventional switched mode power converter with SSR having an opto-coupler for data transmission from the secondary circuit to the primary circuit.
Figure 2A:
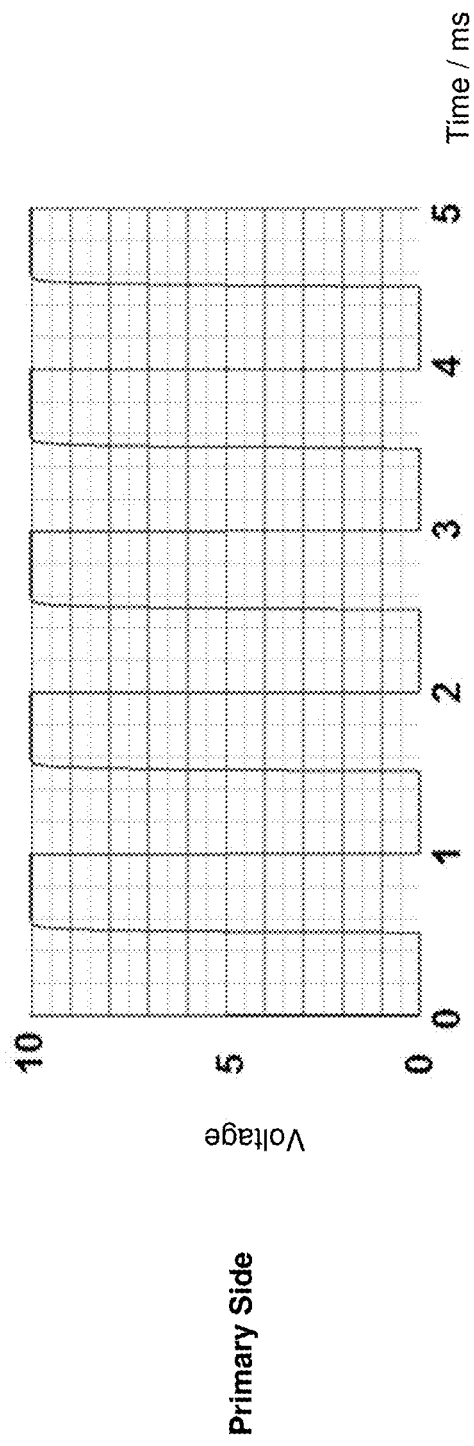
FIG. 2A shows the waveform received by the primary controller from the opto-coupler in accordance with the conventional switched mode power converter of FIG. 1.
Figure 2B:
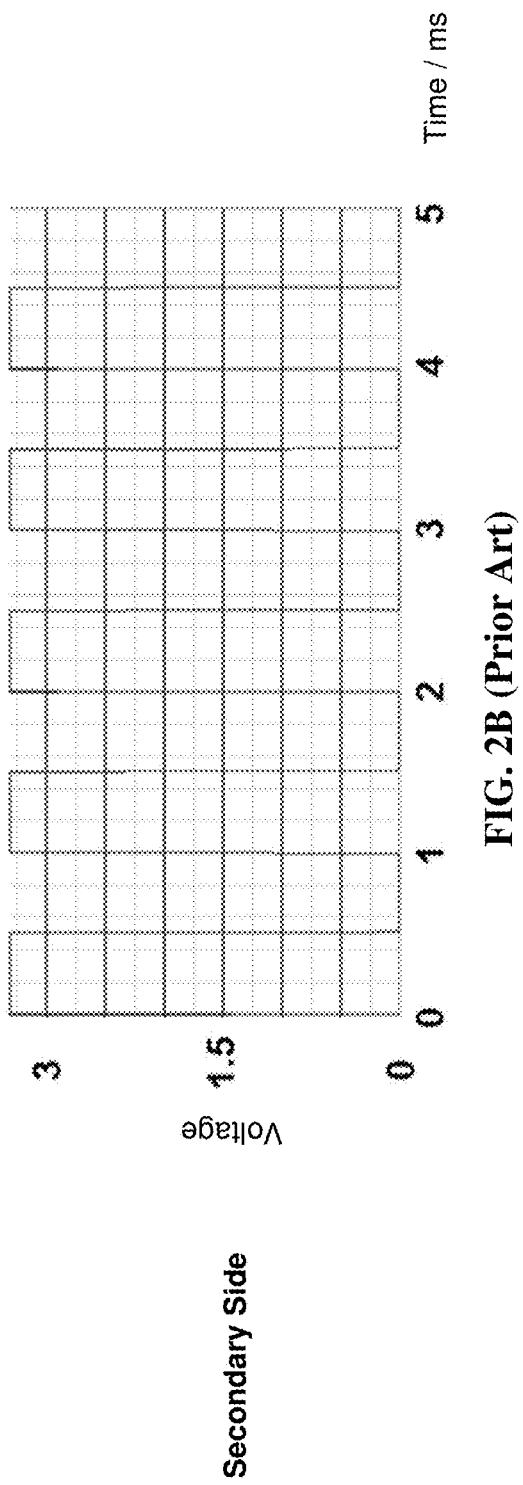
FIG. 2B shows the waveform received by the opto-coupler from the secondary controller in accordance with the conventional switched mode power converter of FIG. 1.
Figure 3:
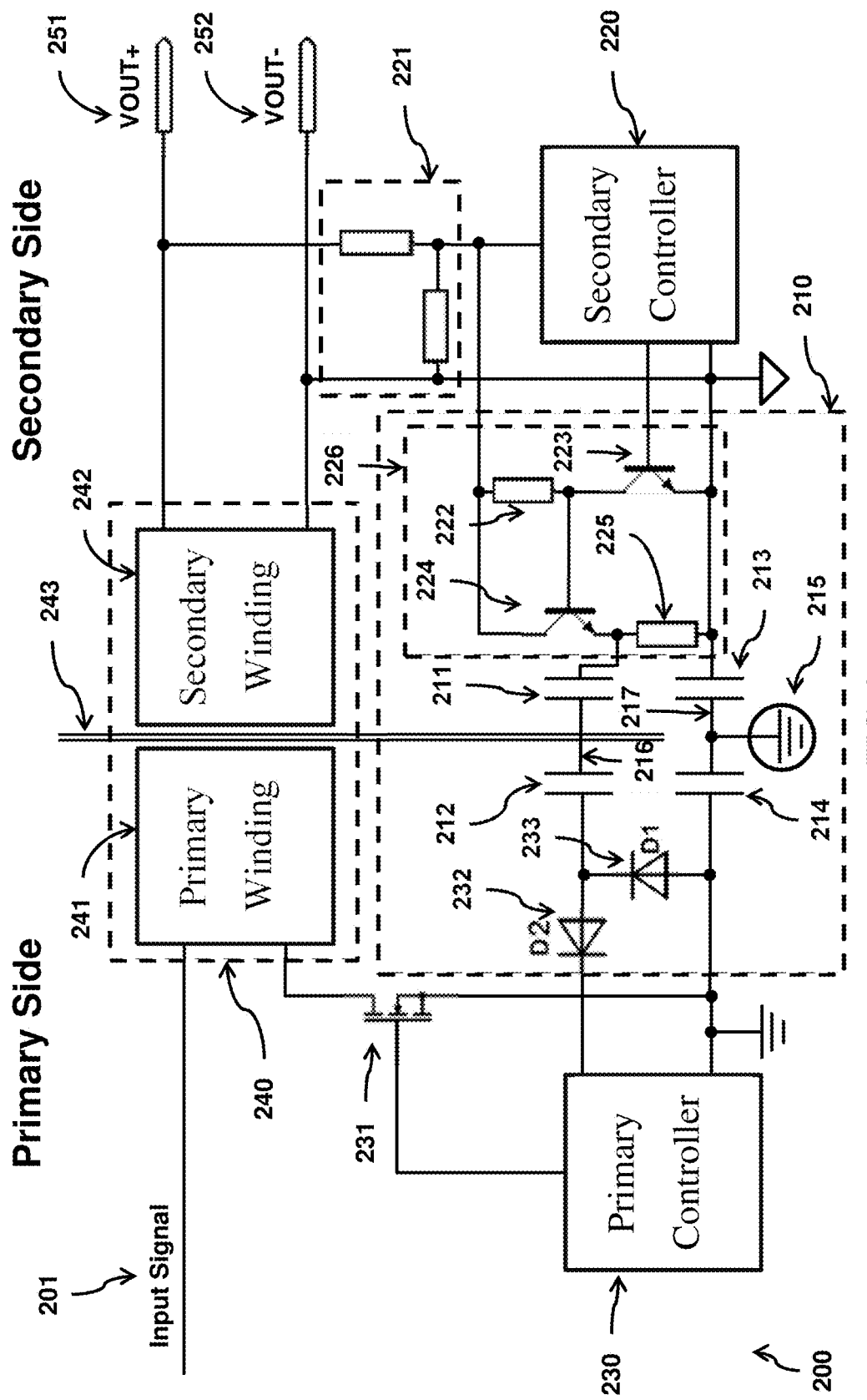
FIG. 3 depicts a simplified circuit diagram of an isolated switched mode power converter with SSR having capacitors for feedback and data transmission from the secondary circuit to the primary circuit in accordance with an exemplary embodiment of the present disclosure.

Referring to FIG. 3, a circuit diagram of an isolated switched mode power converter in accordance with an exemplary embodiment of the present disclosure is depicted. For simplicity and clarity of illustration, common and well-understood elements (such as EMI filter, bridge rectifier, buffer, output rectifier, and smoothing capacitors) may not be depicted in FIG. 3 to facilitate a less obstructed view of the depicted features. The power converter 200 receives an input signal 201 at the primary side for driving the output load at the secondary side. The input signal 201 may be a DC voltage or a rectified signal from an AC main. In case of a DC voltage, the power converter 200 may receive an DC input of a e.g. 400V DC which may be provided by an active power factor correction circuit (PFC) e.g. a boost PFC. In case of a rectified signal, the power converter 200 may receive an AC input of a 120V/60 Hz AC power, a 220V/50 Hz AC power, or other suitable AC power. The AC input may be rectified by a full bridge rectifier or a half bridge rectifier to obtain the rectified signal. On the secondary side, output load is connected to the VOUT+ 251 and VOUT− 252, which may comprise one or more light emitting devices or other output loads. In case of a light emitting device, the device can be a solid-state device that converts electrical energy to light, such as a device comprising one or more LEDs, an LED string, an LED array, or any combination thereof. Alternatively, the light emitting device can be a gas discharge lamp, an incandescent lamp, a lighting panel, a low-voltage halogen lamp, or the like, or any combinations thereof. In order to drive the output load, a driving current ($I_{OUT}$) is supplied thereto.

The input signal 201 is coupled to a transformer 240 comprising a primary winding 241 on the primary circuit and a secondary winding 242 on the secondary circuit. The transformer 240 is used to step up or step down the input signal 201 and to isolate the AC main from the circuit on the secondary side. The switching means 231 is configured to control the primary winding 241 of the transformer 240, such that current is induced in the secondary winding 242 of the transformer 240. The primary winding 241 is magnetically coupled to and isolated from the secondary winding 242 by an isolation boundary 243, which can isolate the output load from the primary circuit.

To provide enhanced accuracy on the output current, various SSR schemes may be implemented. As implied by the name, SSR is a scheme involving sensing the output voltage at the secondary side and comparing the sensed output voltage to a reference voltage for determining an error voltage. The error voltage is processed in the secondary controller 220 and converted into a feedback signal, which is transmitted to the primary controller 230 for controlling the at least one switching means 231. The feedback signal of the present disclosure is not limited to an error voltage or a pure feedback from the output of the power converter 200, but may be any signal sensed on the secondary side of the power converter 200. The switching means 231 may be metal oxide semiconductor field-effect transistor (MOSFET), bipolar junction transistor (BJT) or any other switching device known to those skilled in the art. In certain embodiments, the switching means 231 is an NMOS transistor and is drain connected to the primary winding 241 of the transformer 240. The gate of the switching means 231 is controlled by the primary controller 230. The transformer 240 operates in a discontinuous conduction mode. When the switching means 231 is switched off, the current in the primary winding 241 collapses. The switching means 231 is controlled to provide power conversion, such that the current from the input signal 201 is regulated through the transformer 240 and induced to the secondary winding 242 with a driving current ($I_{OUT}$) that can be accurately controlled.

The output signal at VOUT+ 251 is processed by a voltage divider 221 having at least two or more resistors. The resistors used in the present disclosure may be a thin film resistor, a surface mounted chip resistor, or any other type of resistor known to those skilled in the art. From the voltage divider 221, a voltage for powering the secondary controller 220 is generated by tapping the two or more resistors at an intermediate location.

The secondary controller 220 is configured to sense the output voltage and/or inductor current continuously, and transmit a feedback signal to the primary controller 230. Advantageously, the power converter 200 does not have an opto-coupler for feedback and data transmission from the secondary circuit to the primary circuit. Instead, the power converter 200 comprises a data transmission circuit 210 connecting the secondary circuit to the primary circuit. The data transmission circuit 210 comprises a plurality of Y-capacitors 211, 212, 213, 214. A Y-capacitor used for the present disclosure is a capacitor with sufficient voltage rating to safely span the isolation boundary 243 between the primary circuit and the secondary circuit of the power converter 200. Generally, Y-capacitors can be used for suppressing the high frequency electromagnetic interference (EMI) between the primary side and the secondary side. In certain embodiments, the Y-capacitors may be polarized electrolytic capacitors, such as aluminum electrolytic capacitors or tantalum electrolytic capacitors. The voltage rating of the capacitors should be selected to correspond to the operating voltage of the power converter 200. There are at least one or more first Y-capacitors 211, 212 on a feedback path 216 across the isolation boundary 243 and one or more second Y-capacitors 213, 214 on a ground path 217 across the isolation boundary 243.

The data transmission circuit 210 further comprises a two-stage voltage amplifier 226 connected between the secondary controller 220 and the one or more first Y-capacitors. The output of the two-stage voltage amplifier 226 is connected to the feedback path 216 on the secondary side, while the ground of the two-stage voltage amplifier 226 (secondary ground) is connected to the ground path 217 on the secondary side. The two-stage voltage amplifier 226 is a cascade of a common emitter amplifier followed by a common collector amplifier. In the first stage, the common emitter amplifier comprises a first resistor 222 and a first BJT 223. The base of the first BJT 223 is connected to the secondary controller 220 as input, and the collector of the first BJT 223 is connected to the first resistor 222 and the second stage. In the second stage, the common collector amplifier (or known as an emitter follower) comprises a second resistor 225 and a second BJT 224. The base of the second BJT receives the signal from the first stage, and the emitter of the second BJT 224 is connected the second resistor 225 and the feedback path 216 across the isolation boundary 243. The common emitter amplifier can provide a relatively higher input resistance, and the common collector amplifier has a low output resistance. Therefore, the use of the two-stage voltage amplifier 226 in the data transmission circuit 210 can increase the input resistance, lower the output resistance, and achieve large gains. It is easily understood by those skilled in the art that the two-stage voltage amplifier 226 may be implemented by using other semiconductor devices or discrete components, such as MOSFET, and buffer, or by integrating and encompassing within the secondary controller 220, a microcontroller (MCU), a custom integrated circuit, a field-programmable gate array (FPGA), or an application specific integrated circuit (ASIC) to achieve the same advantages without departing from the purpose and the scope of the present disclosure.

Figure 4A:
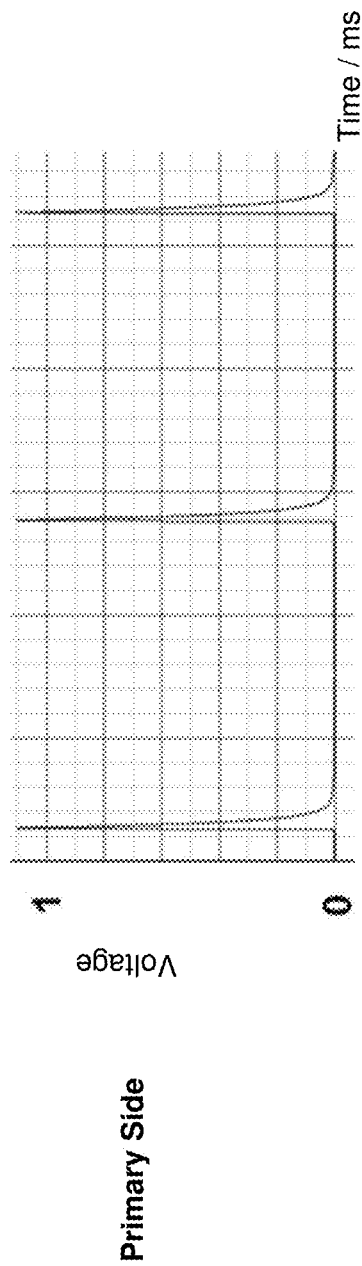
FIG. 4A shows the waveform received by the primary controller in accordance with an exemplary embodiment of the present disclosure.
Figure 4B:
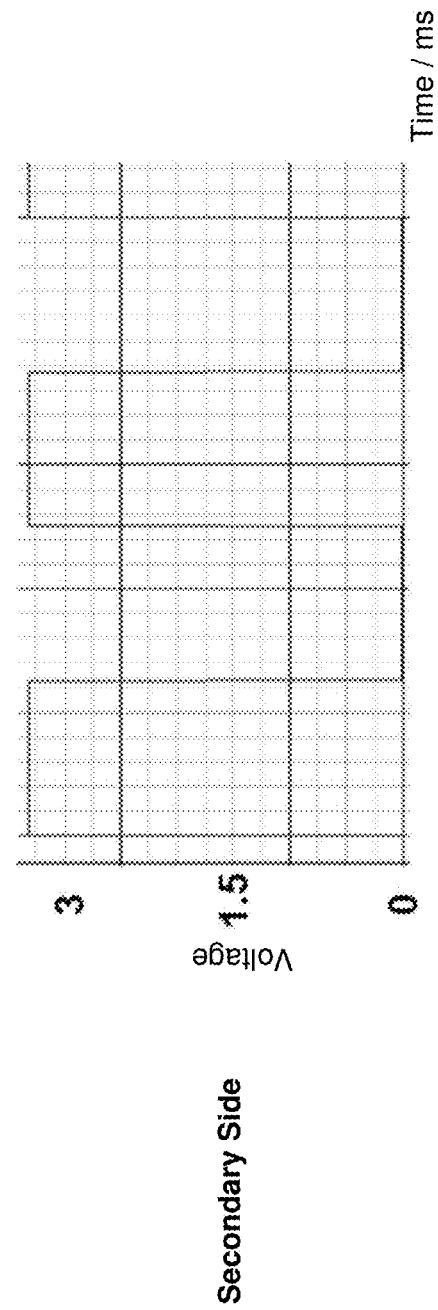
FIG. 4B shows the waveform generated by the secondary controller in accordance with an exemplary embodiment of the present disclosure.

On the feedback path 216 across the isolation boundary 243, the first Y-capacitors 211, 212 are arranged to receive a feedback signal from the secondary controller 220 and the feedback signal is transmitted through the one or more Y-capacitors 211, 212, 213, 214 across the isolation boundary 243 to become a primary side feedback signal, which can be a voltage surge signal or a pulse. The feedback signal provided by the secondary controller 220 can be a square wave, as shown in FIG. 4B, which defines the characteristics of the modulation signal, e.g. pulse width modulation (PWM) signal, for controlling the switching means 231 in the primary circuit. However, it is apparent that the feedback signal cannot directly connect to the primary controller 230, and it is not possible to route a connection from the secondary controller 220 to the primary controller 230 across the isolation boundary 243. Any attempt in transmitting the exact waveform of the feedback signal to the primary controller 230 may require an opto-coupler or other specifically designed device(s). The present disclosure advantageously provides a method for transmitting a primary side feedback signal across the isolation boundary 243. As shown in FIG. 4A, a plurality of voltage sparks is received by the primary controller 230 at the primary circuit. Each voltage spark corresponds to a rising edge on the feedback signal, while the voltage spark corresponds to a falling edge on the feedback signal is filtered out by the first diode (D1) 233 and the second diode (D2) 232. The first diode (D1) 233 has a cathode coupled to the feedback path 216 at the first Y-capacitor 212, and an anode coupled to the primary ground. The second diode (D2) 232 has a cathode coupled to the primary controller 230 and an anode coupled to the feedback path 216 at the first Y-capacitor 212.

On the feedback path 216, the primary side feedback signal from the data transmission circuit 210 is coupled to the primary controller 230 based on the feedback signal from the secondary controller 220. On the ground path 217, the secondary ground is connected to the primary ground via the ground path 217 of the data transmission circuit 210. In certain embodiments, the ground path 217 has two or more second Y-capacitors 213, 214 connected in series, and a protective earth 215 is connected between any two adjacently connected Y-capacitors (e.g., between 213 and 214). Preferably, the protective earth 215 is connected to the case of the device having the power converter 200.

With the power converter 200 of the present disclosure, the data transmission between the secondary side and the primary side is realized using a plurality of Y-capacitors. Therefore, by replacing the opto-coupler with the Y-capacitors, the data transmission circuit 210 can be implemented with a significantly lower cost. As the Y-capacitors is a capacitor with sufficient voltage rating to safely span the isolation boundary, which can be used for suppressing the high frequency electromagnetic interference (EMI), the power converter 200 can meet higher surge requirement for outdoor and industrial applications.

In order to enable data transmission via the plurality of Y-capacitors 211, 212, 213, 214, the secondary controller 220 is configured to generate the feedback signal digitally encoded by a coding method such as a special Manchester code described herein. The primary side feedback signal from the data transmission circuit 210 has a great deal of noise in a noisy environment or real application device. Unlike the traditional Manchester code, which cannot effectively distinguish between a normal pulse and a noise pulse, the special Manchester code has strong anti-interference characteristics. The data format of the special Manchester code is depicted in FIG. 5. The special Manchester code is characterized in that a transition from a presence of a first pulse train to an absence of the first pulse train represents a logic 1, and another transition from an absence of a second pulse train to a presence of the second pulse train represents a logic 0. In certain embodiments, the time period for the pulse train is half of the period (T/2). The first pulse train and the second pulse train are delivered periodically by the secondary controller 220 in the form of a plurality of pulses for a period in the range of 1 ms to 20 ms (T/2=1-20 ms). In one embodiment, a pulse train having 100 pulses is provided by the secondary controller 220 with a period (T) of 20 ms. A transition from a presence of a first pulse train having 100 pulses in 10 ms to another 10 ms without any pulses represents a logic 1. A transition from 10 ms without any pulses to a presence of a first pulse train having 100 pulses in 10 ms represents a logic 0. It is apparent to those skilled in the art that the arrangement of the special Manchester code, the number of pulses, and the period may be modified without departing from the purpose and the scope of the present disclosure. With the special Manchester code, an acceptable range on the number of pulses is used for determining the presence of the pulse train, such that noise coupling may not cause an error in the data detection.

FIG. 6 further provides a table showing the data format of the feedback signal transmitted from the secondary controller 220 to the primary controller 230. The feedback signal is arranged to carry a data packet. In certain embodiments, the data packet has 16 bits in length. The most significant bit is the start bit, followed by a reserved bit, a plurality of data bits, a parity bit, and a stop bit. The default value of the reserved bit is 1. There may be as many as 12 data bits in the exemplary embodiment, and the parity bit is 1 if the data is even. The stop bit is the least significant bit and the default value of the stop bit is 1. The proposed format of the data packet is one exemplary arrangement, and it is apparent that the data packet may be arranged in other manners without departing from the purpose and the scope of the present disclosure.

Figure 7:
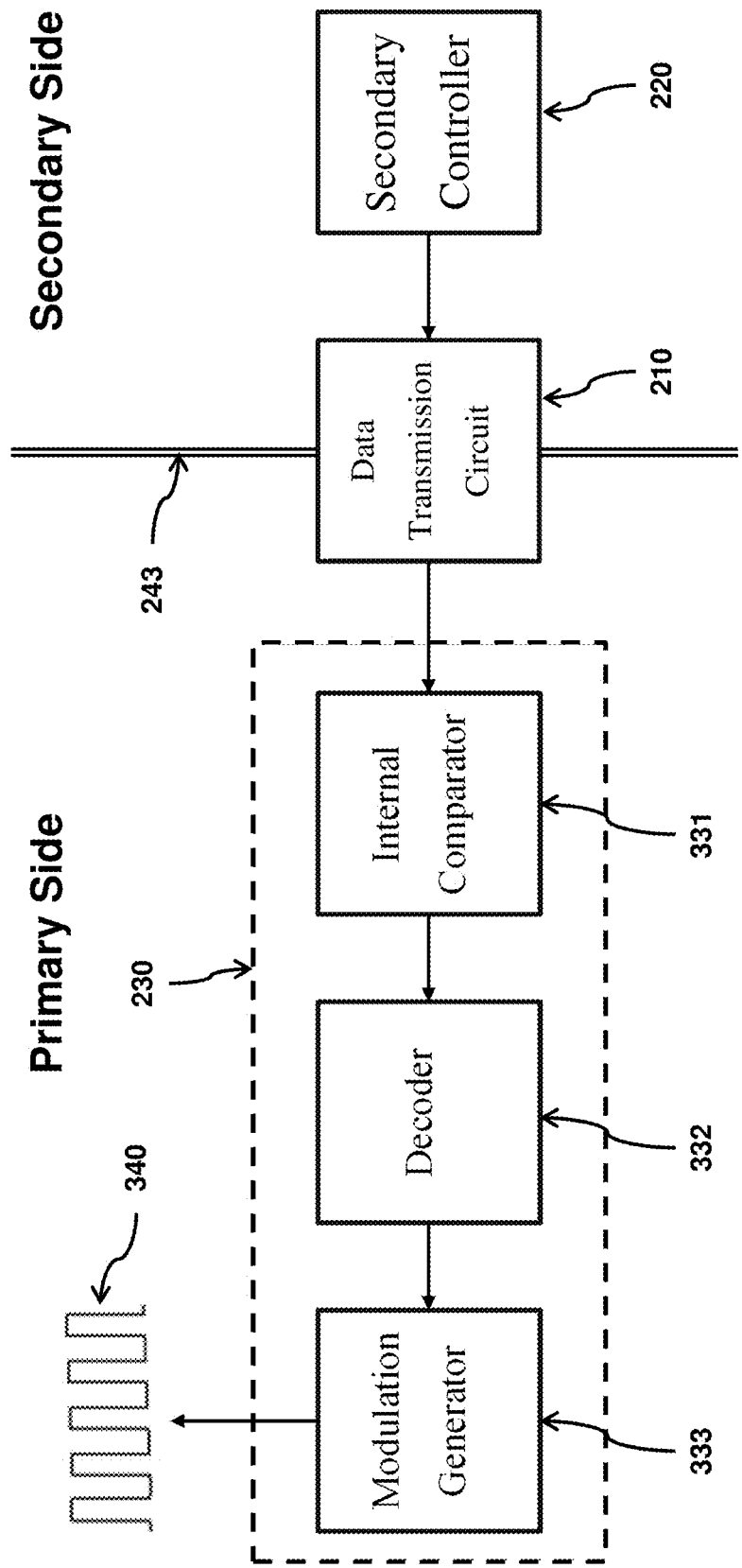
FIG. 7 depicts a block diagram showing the data transmission from the secondary controller to the primary controller in accordance with an exemplary embodiment of the present disclosure.
Figure 10:
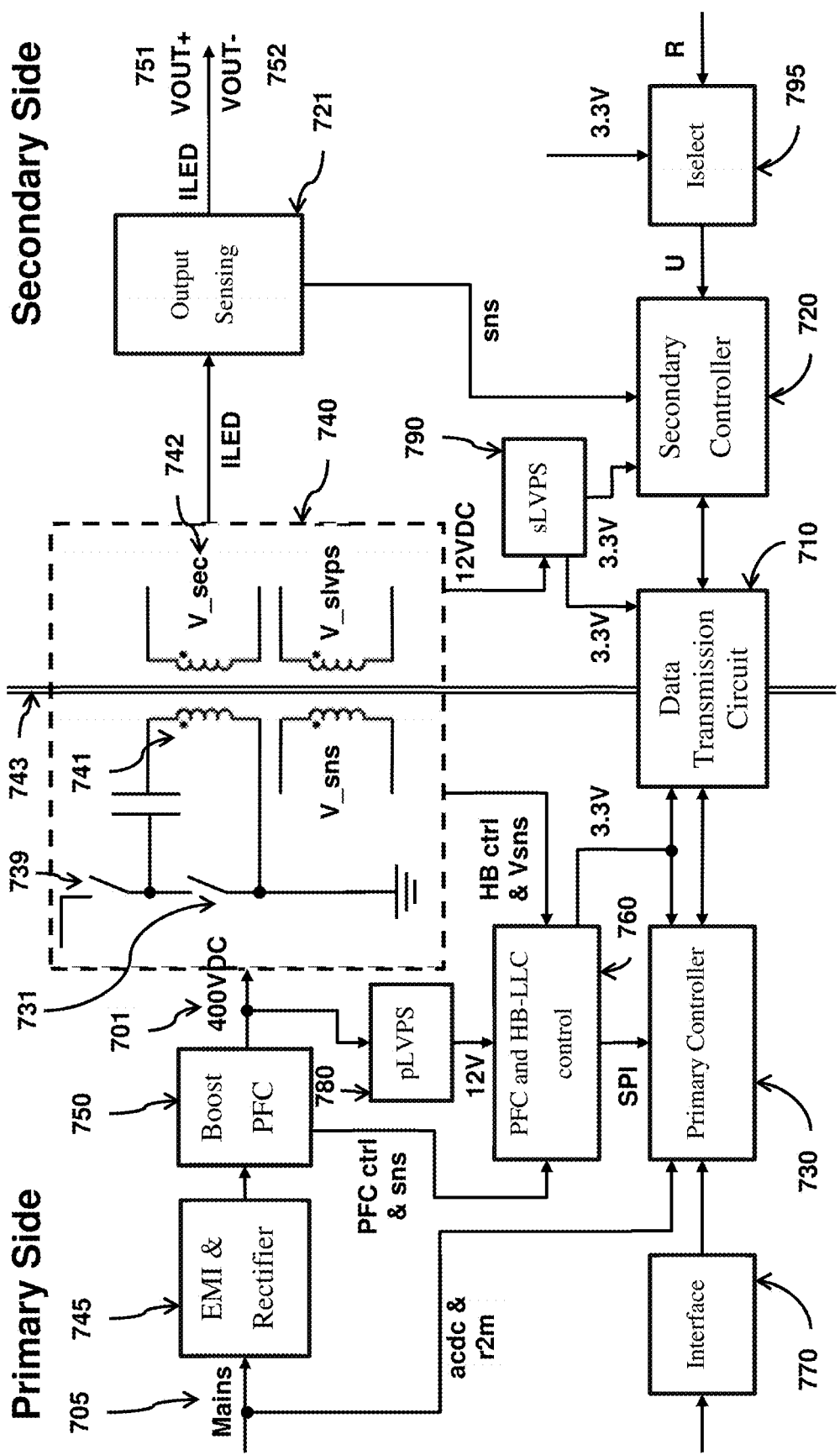
FIG. 10 depicts another exemplary circuit diagram of an isolated switched mode power converter with SSR having capacitors for feedback and data transmission from the secondary circuit to the primary circuit in accordance with an exemplary embodiment of the present disclosure.

Turning now to FIG. 7, a block diagram showing the data transmission from the secondary controller 220 to the primary controller 230 is shown. The primary controller 230 comprises an internal comparator 331, a decoder 332, and a modulation generator 333 (e.g. PWM generator, frequency modulation generator, or a combination thereof). The internal comparator 331 is configured to eliminate background noise and other unwanted noise couplings. The decoder 332 is a special Manchester code decoder configured to decode the received primary side feedback signal. The decoder 332 identifies the presence and absence of the pulse train in the primary side feedback signal, and determines the logic 1 and logic 0 in accordance with the data format of the special Manchester code as detailed in FIG. 5. The decoded result is then used to generate a modulated signal 340 by the modulation generator 333 for controlling the switching means 231 in the primary circuit to be conducting for a duty cycle as determined by the secondary controller 220. The duty cycle is controlled to regulate an output characteristic of the power converter 200, such as an output voltage, a driving current ($I_{OUT}$), or a combination thereof. In this example, the modulation generator 333 is formed by a pulse width modulation (PWM) generator which varies the duty cycle. In an alternative embodiment the modulation generator 333 may generate a frequency modulated signal 340, e.g. in case that a half-bridge LLC (HB-LLC) converter, as shown in the example of FIG. 10, is controlled.

Figure 8A:
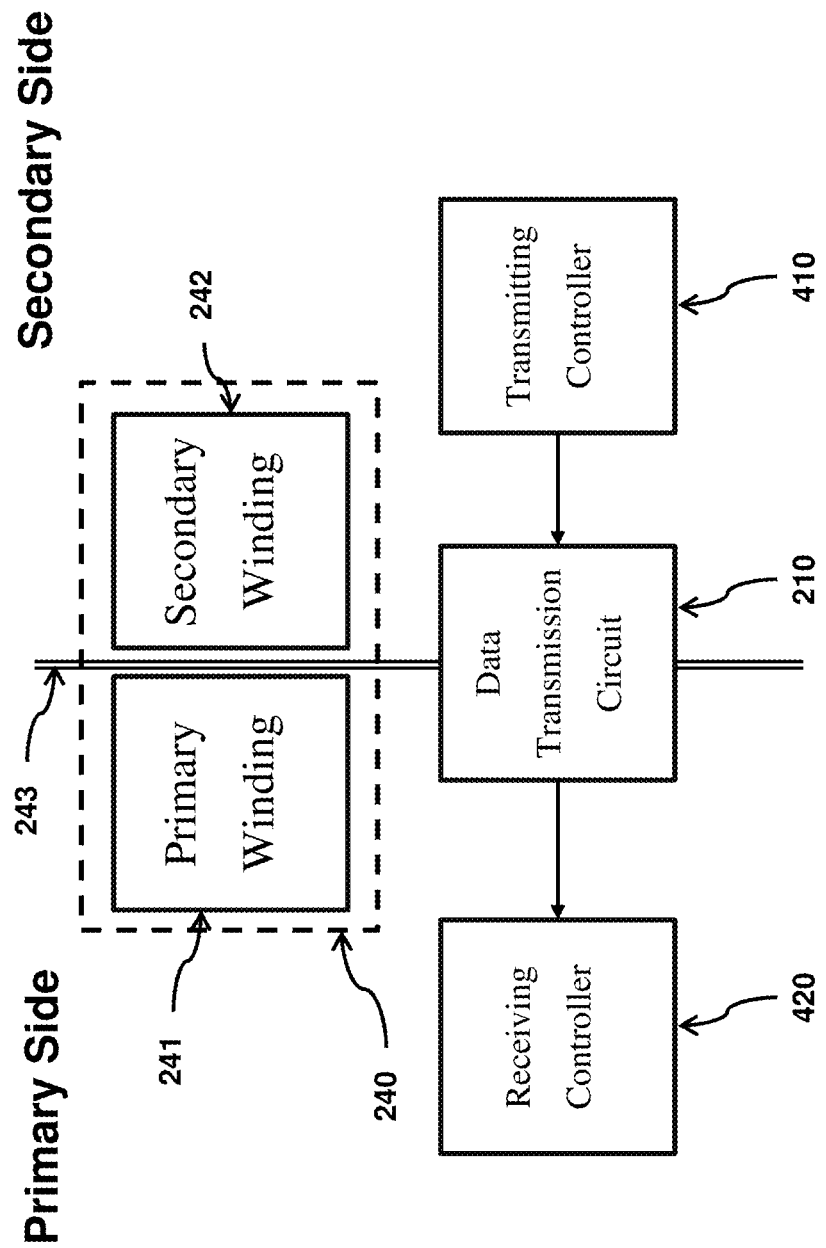
FIG. 8A depicts a block diagram showing a first arrangement of the power converter for transmitting signal from the secondary side to the primary side in accordance with an exemplary embodiment of the present disclosure.
Figure 8B:
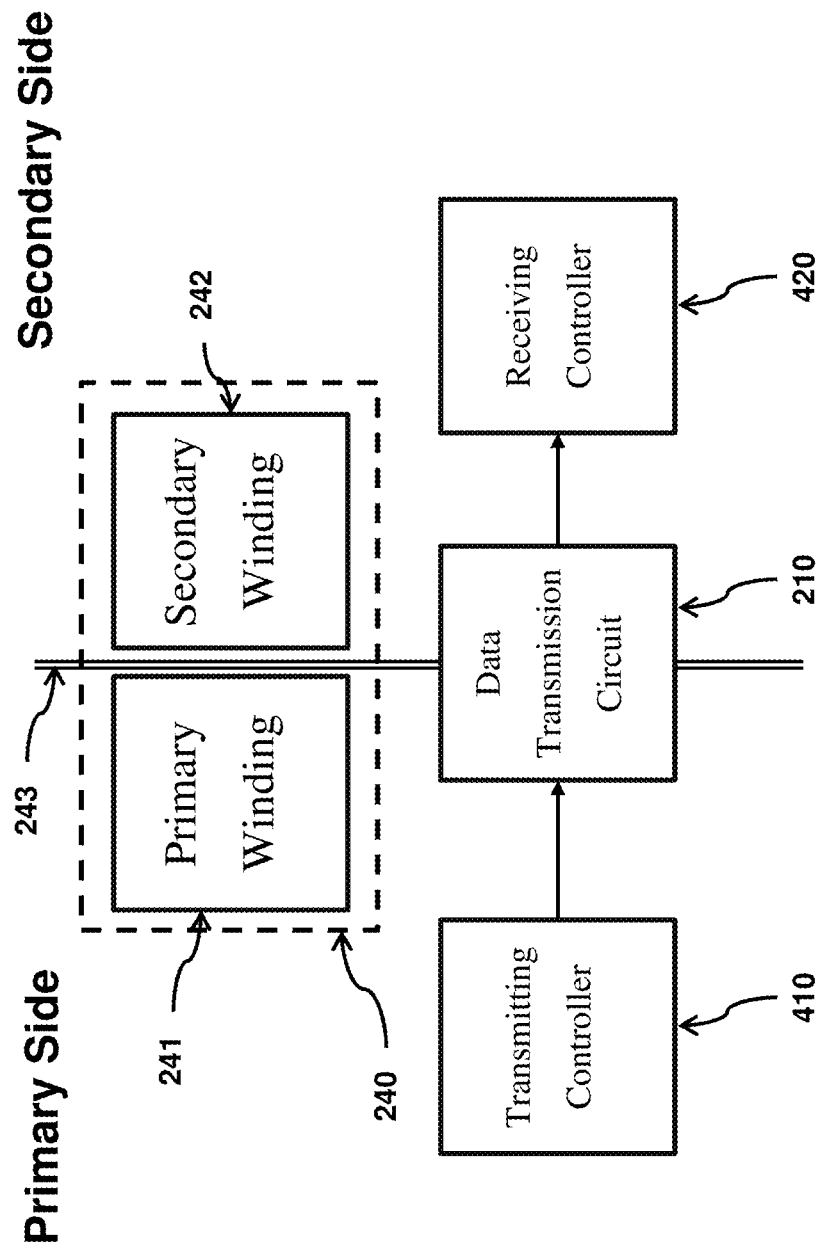
FIG. 8B depicts a block diagram showing a second arrangement of the power converter for transmitting signal from the primary side to the secondary side in accordance with an exemplary embodiment of the present disclosure.

As demonstrated in FIG. 8A and FIG. 8B, the method for transmitting data via a plurality of Y-capacitors using the special Manchester code may also be applied to data transmission across the isolation boundary 243 from the primary controller 230 to the secondary controller 220. In certain embodiments, the power converter comprises a transformer 240, a transmitting controller 410, a receiving controller 420, and a data transmission circuit 210. The transmitting controller 410 and the receiving controller 420 are provided in two circuits isolated from each other in the power converter. Therefore, the receiving controller 420 is isolated from the transmitting controller 410 by the transformer. The data transmission circuit 210 connecting the transmitting controller 410 to the receiving controller 420 for transmitting a feedback signal. The data transmission circuit 210 comprises a plurality of Y-capacitors and a two-stage voltage amplifier, and the plurality of Y-capacitors comprises one or more first Y-capacitors on a feedback path and one or more second Y-capacitors on a ground path. The transmitting controller 410 is configured to generate the feedback signal digitally encoded by a coding method such as a special Manchester code. The feedback signal is transmitted through the plurality of Y-capacitors to become a primary side feedback signal receivable by the receiving controller 420. The two-stage voltage amplifier is connected between the transmitting controller 410 and the one or more first Y-capacitors.

With this arrangement, the transmitting controller 410 couples the feedback signal to the one or more first Y-capacitors such that the primary side feedback signal is coupled to the receiving controller 420 based on the feedback signal. The primary side feedback signal is a voltage surge signal comprising a plurality of voltage sparks corresponding to rising edges of the feedback signal, while the voltage spark corresponding to a falling edge on the feedback signal is filtered out. The special Manchester code is characterized in that a transition from a presence of a first pulse train to an absence of the first pulse train represents a logic 1, and another transition from an absence of a second pulse train to a presence of the second pulse train represents a logic 0. In certain embodiments, the first pulse train and the second pulse train are delivered periodically by the transmitting controller 410 in the form of a plurality of pulses for a period in the range of 1 ms to 20 ms (T/2=1-20 ms). In one embodiment, a pulse train having 100 pulses is provided by the transmitting controller 410 with a period (T) of 20 ms. The feedback signal is arranged to carry a data packet. In certain embodiments, the data packet has 16 bits in length. The most significant bit is the start bit, followed by a reserved bit, a plurality of data bits, a parity bit, and a stop bit.

Figure 8C:
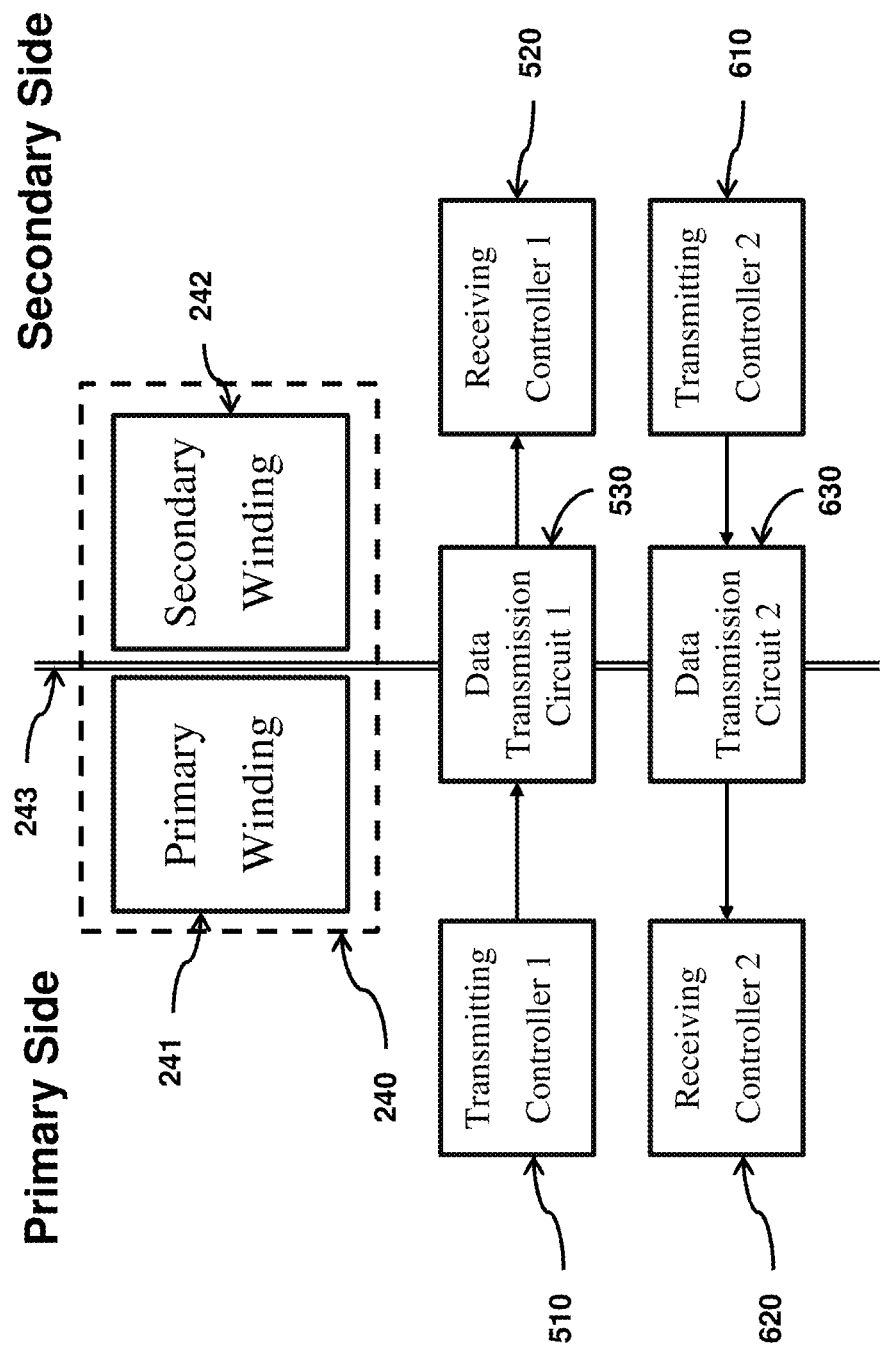
FIG. 8C depicts a block diagram showing a third arrangement of the power converter for transmitting bidirectional signal in accordance with an exemplary embodiment of the present disclosure.

Referring to FIG. 8C, the transmission is not limited to a unidirectional communication, and in certain embodiments, the power converter may comprise two data transmission circuits 530, 630 for achieving a bidirectional communication between the primary side and the secondary side. On the primary side, there is a first transmitting controller 510 and a second receiving controller 620. On the secondary side, there is a first receiving controller 520 and a second transmitting controller 610. The first transmitting controller 510 is configured to generate a first feedback signal, which is transmitted through the first data transmission circuit 530 to become a first primary side feedback signal. Similarly, the second transmitting controller 610 is configured to generate a second feedback signal, which is transmitted through the second data transmission circuit 630 to become a second primary side feedback signal.

Figure 9:
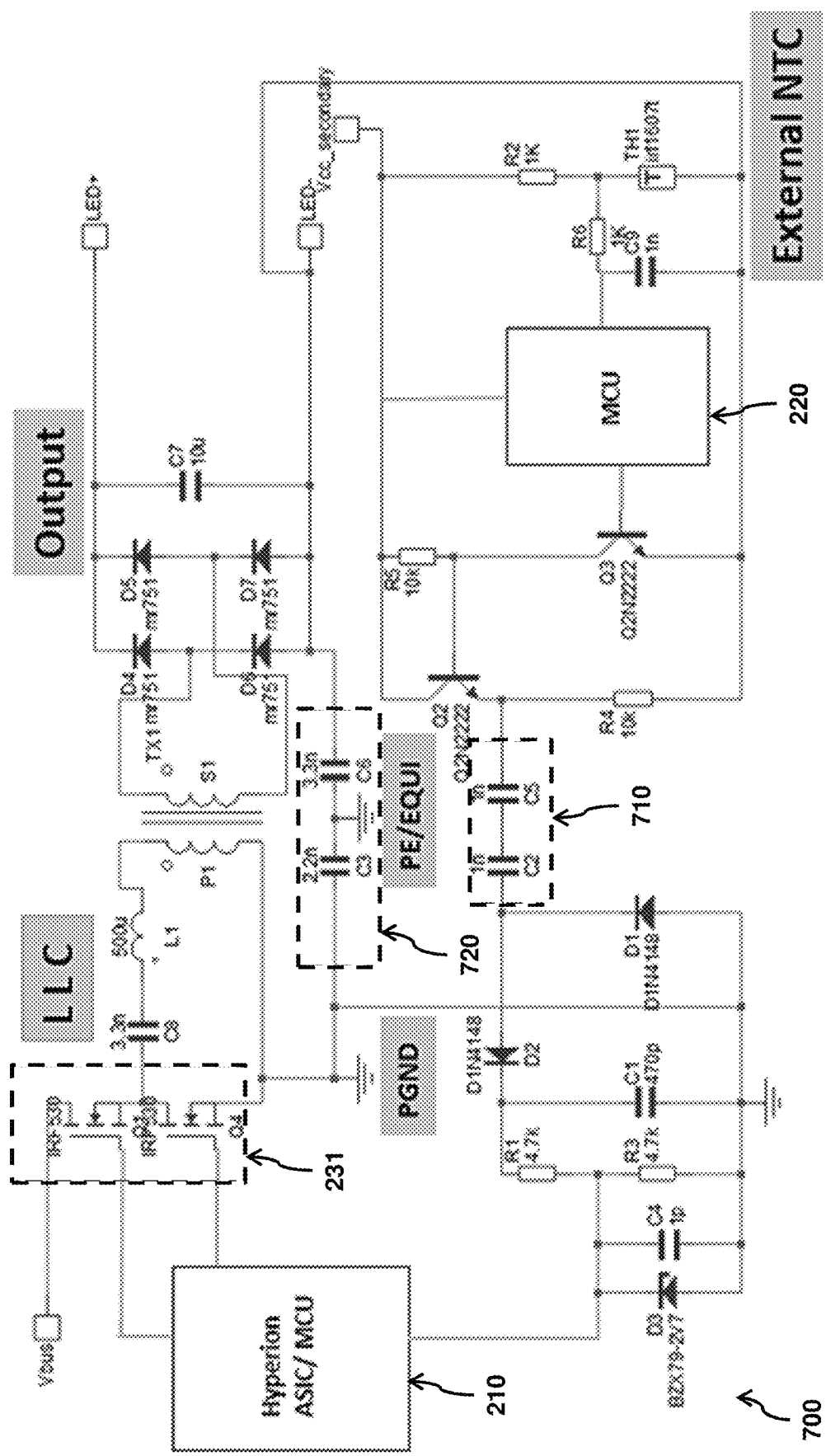
FIG. 9 depicts an exemplary circuit diagram of an isolated switched mode power converter with SSR having capacitors for feedback and data transmission from the secondary circuit to the primary circuit in accordance with an exemplary embodiment of the present disclosure.

FIG. 9 depicts an exemplary circuit diagram of an isolated switched mode power converter 200 for a lighting system with SSR having capacitors (e.g. Y-capacitors) for feedback and data transmission from the secondary circuit to the primary circuit. The power converter 200 is used in a lighting system for driving one or more light emitting devices, preferably for outdoor applications. The light emitting device can be a solid-state device that converts electrical energy to light, comprise one or more LEDs, an LED string, an LED array, or any combination thereof. The secondary controller 220 is an MCU configured to detect a value of an external NTC thermistor or a second value of an external resistor (not shown in FIG. 9) which defines a nominal output current to be provided by the power converter 200, and send the value to the primary circuit via a plurality of Y-capacitors (C2, C5 on the feedback path and C3, C6 on the ground path). A feedback signal is sensed on the secondary side of the power converter 200 by the NTC, and transmitted to the primary circuit as a primary side feedback signal. The primary controller 230 is configured to receive the primary side feedback signal and generate a PWM signal for controlling the two switching means 231 in the primary circuit.

FIG. 10 depicts another exemplary circuit diagram of an isolated switched mode power converter 700 for a lighting system with SSR having capacitors (e.g. Y-capacitors) for feedback and data transmission from the secondary circuit to the primary circuit. The power converter 700 is based on a combination of a boost PFC followed by a LLC converter comprising two switching means, which is used in a lighting system for driving one or more light emitting devices, preferably for outdoor applications. The power converter 700 may receive a supply voltage 705, which may be a DC voltage or an AC voltage from an AC main. The supply voltage 705 is filtered and rectified by an EMI filter and a rectification block 745. The rectified voltage from the output of the EMI filter and the rectification block 745 is provided to the active PFC circuit 750, e.g. a boost PFC, which provides a DC input of a e.g. 400V DC as input signal 701 to the following DC-DC-converter which is a HB-LLC converter comprising a transformer 740 having a primary winding 741, a secondary winding 742, and two switching elements 731, 739 in this example. The light emitting device can be a solid-state device that converts electrical energy to light, comprise one or more LEDs, an LED string, an LED array, or any combination thereof. On the secondary side, output load is connected to the VOUT+ 751 and VOUT− 752, which may comprise one or more light emitting devices or other output loads. The secondary controller 720 is an MCU configured to detect a value on the secondary side of the transformer 740 e.g. the current and/or voltage provided to the light emitting device, by a output sensing block 721 and/or a value of an external resistor 795 which may define the nominal LED current to be provided by the power converter 700, and send the value to the primary circuit via a plurality of Y-capacitors (not shown here but similar to the Y-capacitors 211, 212, 213, 214) by the data transmission circuit 710. The primary controller 730 is configured to receive the feedback signal and to forward this information about the feedback signal to the control block PFC and HB-LLC control 760 which may be an ASIC or other control IC to generate a pulsed signal for controlling the switching means 731 and 739 in the primary circuit. The primary controller 730 and the PFC and HB-LLC control 760 may be also integrated in to one integrated circuit, e.g. as ASIC or microcontroller. The primary controller 730 may be configured to receive control bus signals, e g dimming commands like digital addressable lighting interface (DALI) bus commands, via an interface 770.

The isolated switched mode power converter 700 further comprises a primary side low voltage supply 780 and a secondary side low voltage supply 790.

In the present disclosure, a detailed description of an isolated switched mode power converter with SSR for powering one or more output loads is provided. It is easily understood by those skilled in the art that power supplies using various isolated topologies, such as DC to DC converter, half-bridge resonant converter, forward converter, flyback converter, and other transformer-based power converters, can also implement the data transmission using a plurality of Y-capacitors based on a special Manchester code as feedback to achieve the same advantages without departing from the purpose and the scope of the present disclosure. The power converter may be SSR or primary side regulation (PSR), as long as a data tranmission across the isolation boundary is required.

The present disclosure may be embodied in other specific forms without departing from the spirit or essential characteristics thereof. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

The invention claimed is:

1. A power converter with secondary side regulation (SSR) for driving one or more output loads such as light emitting diodes (LEDs), the power converter comprising:
   a transformer including a primary winding and a secondary winding;
   a primary circuit comprising one or more switching means coupled to the primary winding and a primary controller;
   a secondary circuit being isolated from the primary circuit by the transformer and connected to the one or more output loads and the secondary winding, the secondary circuit comprising a secondary controller; and
   a data transmission circuit connecting the secondary circuit to the primary circuit for transmitting a feedback signal, the data transmission circuit comprising a plurality of capacitors;
   wherein:
   the plurality of capacitors comprises one or more first capacitors on a feedback path and one or more second capacitors on a ground path;
   the feedback signal is transmitted through the plurality of capacitors to become a primary side feedback signal at the primary circuit; and
   the ground path has two or more second capacitors connected in series, and a protective earth is connected between any two adjacently connected capacitors of the two or more second capacitors.

2. The power converter of claim 1, wherein the plurality of capacitors are a plurality of Y-capacitors.

3. The power converter of claim 1, wherein the secondary controller couples the feedback signal to the one or more first capacitors such that the primary side feedback signal is coupled to the primary controller based on the feedback signal.

4. The power converter of claim 1, wherein the primary side feedback signal is a voltage surge signal comprising a plurality of voltage sparks corresponding to rising edges of the feedback signal.

5. The power converter of claim 1, wherein the secondary controller is configured to generate the feedback signal digitally encoded by a coding method.

6. The power converter of claim 5, wherein the coding method is a Manchester code modified to effectively distinguish between a normal pulse and a noise pulse.

7. The power converter of claim 1, wherein the feedback signal is arranged to carry a data packet comprising a start bit, a plurality of data bits, a parity bit, and a stop bit.

8. The power converter of claim 1, wherein the primary controller comprises an internal comparator, a decoder, and a modulation generator selected from the group consisting of a pulse width modulation (PWM) generator, a frequency modulation generator, and a combination thereof.

9. The power converter of claim 1, wherein the secondary controller is configured to detect a value of a negative temperature coefficient (NTC) thermistor in the secondary circuit or a second value of an external resistor which defines a nominal output current to be provided by the power converter.

10. A power converter with secondary side regulation (SSR) for driving one or more output loads such as light emitting diodes (LEDs), the power converter comprising:
    a transformer including a primary winding and a secondary winding;
    a primary circuit comprising one or more switching means coupled to the primary winding and a primary controller;
    a secondary circuit being isolated from the primary circuit by the transformer and connected to the one or more output loads and the secondary winding, the secondary circuit comprising a secondary controller; and
    a data transmission circuit connecting the secondary circuit to the primary circuit for transmitting a feedback signal, the data transmission circuit comprising a plurality of capacitors;

wherein:
the plurality of capacitors comprises one or more first capacitors on a feedback path and one or more second capacitors on a ground path;
the feedback signal is transmitted through the plurality of capacitors to become a primary side feedback signal at the primary circuit;
wherein the secondary controller is configured to generate the feedback signal digitally encoded by a coding method that is a Manchester code modified to effectively distinguish between a normal pulse and a noise pulse, said modified Manchester code is characterized in that a transition from a presence of a first pulse train to an absence of the first pulse train represents a logic 1, and another transition from an absence of a second pulse train to a presence of the second pulse train represents a logic 0.

11. The power converter of claim 10, wherein the first pulse train and the second pulse train are delivered periodically in a form of a plurality of pulses for a period in the range of 1 ms to 20 ms.

12. The power converter of claim 10, wherein the first pulse train and the second pulse train are delivered periodically with 100 pulses in 10 ms.

13. A power converter with secondary side regulation (SSR) for driving one or more output loads such as light emitting diodes (LEDs), the power converter comprising:

a transformer including a primary winding and a secondary winding;
a primary circuit comprising one or more switching means coupled to the primary winding and a primary controller;
a secondary circuit being isolated from the primary circuit by the transformer and connected to the one or more output loads and the secondary winding, the secondary circuit comprising a secondary controller; and
a data transmission circuit connecting the secondary circuit to the primary circuit for transmitting a feedback signal, the data transmission circuit comprising a plurality of capacitors;
wherein:
the plurality of capacitors comprises one or more first capacitors on a feedback path and one or more second capacitors on a ground path;
the feedback signal is transmitted through the plurality of capacitors to become a primary side feedback signal at the primary circuit; and
the data transmission circuit further comprises a two-stage voltage amplifier connected between the secondary controller and the one or more first capacitors.

14. The power converter of claim 13, wherein the two-stage voltage amplifier is a cascade of a common emitter amplifier followed by a common collector amplifier.

* * * * *